(12) United States Patent
Russell et al.

(10) Patent No.: US 7,116,764 B1
(45) Date of Patent: Oct. 3, 2006

(54) NETWORK INTERFACE UNIT HAVING AN EMBEDDED SERVICES PROCESSOR

(75) Inventors: Gary P. Russell, King of Prussia, PA (US); Gregory J. Small, Phoenixville, PA (US); Robert T. Miller, Dresher, PA (US); Charles M. Bartholomew, King of Prussia, PA (US)

(73) Assignee: Unisys Corporation, Blue Bell, PA (US)

( * ) Notice: Subject to any disclaimer, the term of this patent is extended or adjusted under 35 U.S.C. 154(b) by 996 days.

(21) Appl. No.: 09/636,656

(22) Filed: Aug. 11, 2000

(51) Int. Cl.
*H04M 11/06* (2006.01)
*H04L 12/58* (2006.01)

(52) U.S. Cl. .................. 379/88.13; 455/412.1
(58) Field of Classification Search ............. 379/88.08, 379/88.09, 88.13, 88.14, 88.17; 704/260; 709/250; 710/1
See application file for complete search history.

(56) References Cited

U.S. PATENT DOCUMENTS

| | | | |
|---|---|---|---|
| 4,688,212 A | 8/1987 | MacGinitie et al. .......... 370/85 |
| 5,029,199 A | 7/1991 | Jones et al. .................... 379/89 |
| 5,133,004 A | 7/1992 | Heileman, Jr. et al. ....... 379/67 |
| 5,134,647 A | 7/1992 | Pugh et al. |
| 5,138,710 A | 8/1992 | Kruesi et al. ................ 395/575 |
| 5,283,879 A * | 2/1994 | Carteau et al. ................ 710/1 |
| 5,301,226 A | 4/1994 | Olson et al. ................... 379/67 |
| 5,323,450 A | 6/1994 | Goldhagen et al. ......... 379/100 |
| 5,384,829 A | 1/1995 | Heileman, Jr. et al. ....... 379/67 |
| 5,394,460 A | 2/1995 | Olson et al. ................... 379/67 |
| 5,513,314 A | 4/1996 | Kandasamy et al. ... 395/182.04 |
| 5,557,668 A | 9/1996 | Brady ......................... 379/212 |
| 5,572,709 A | 11/1996 | Fowler et al. .............. 395/500 |
| 5,592,611 A | 1/1997 | Midgely et al. ....... 395/182.02 |
| 5,608,865 A | 3/1997 | Midgely et al. ............ 395/180 |
| 5,613,108 A | 3/1997 | Morikawa .................... 393/616 |
| 5,623,538 A | 4/1997 | Petty ............................ 379/67 |
| 5,633,999 A | 5/1997 | Clowes et al. ......... 395/182.04 |
| 5,659,599 A | 8/1997 | Arumainayagam et al. ... 379/89 |
| 5,675,723 A | 10/1997 | Ekrot et al. ............ 395/182.02 |
| 5,678,042 A | 10/1997 | Pisello et al. ............... 395/610 |
| 5,680,551 A | 10/1997 | Martino, II ............ 395/200.15 |
| 5,689,550 A | 11/1997 | Garson et al. |
| 5,689,706 A | 11/1997 | Rao et al. .................... 395/617 |
| 5,696,895 A | 12/1997 | Hemphill et al. ....... 395/182.02 |
| 5,724,347 A | 3/1998 | Bell et al. .................... 370/377 |
| 5,724,418 A | 3/1998 | Brady ......................... 379/212 |
| 5,732,214 A | 3/1998 | Subrahmanyam ...... 395/200.12 |
| 5,740,231 A | 4/1998 | Cohn et al. ................... 379/89 |
| 5,832,240 A | 11/1998 | Larsen et al. |
| 6,078,733 A * | 6/2000 | Osborne ...................... 709/250 |
| 6,233,315 B1 * | 5/2001 | Reformato et al. ....... 379/88.01 |
| 6,233,318 B1 * | 5/2001 | Picard et al. ............. 379/88.17 |
| 6,295,302 B1 * | 9/2001 | Hellwig et al. ............. 370/522 |
| 6,396,907 B1 * | 5/2002 | Didcock .................. 379/88.17 |
| 6,487,533 B1 * | 11/2002 | Hyde-Thomson et al. .. 704/260 |

(Continued)

FOREIGN PATENT DOCUMENTS

EP    0 567 294 A2    10/1993

(Continued)

*Primary Examiner*—Gerald Gauthier
(74) *Attorney, Agent, or Firm*—Lise A. Rode; Mark T. Starr; Woodcock Washburn (57) ABSTRACT

A messaging system having a network interface unit (NIU) with an embedded services processor (ESP) that provides a general purpose computing capability within the NIU and that may also have the ability to connect to networks external to the messaging system via that general purpose computing capability is disclosed.

12 Claims, 6 Drawing Sheets

U.S. PATENT DOCUMENTS 6,792,082 B1 * 9/2004 Levine ................ 379/67.1

FOREIGN PATENT DOCUMENTS

| | | |
|---|---|---|
| EP | 0 760 573 A3 | 3/1997 |
| WO | WO 95 24092 A | 9/1995 |
| WO | WO 97/12469 | 3/1997 |

* cited by examiner (Prior Art)

NETWORK INTERFACE UNIT HAVING AN EMBEDDED SERVICES PROCESSOR

FIELD OF THE INVENTION

The present invention relates generally to voice messaging systems having network interface units that interface the messaging systems to a telephone network and, more particularly, to a network interface unit having an embedded processor capable of executing software applications not otherwise capable of execution on the NIU and capable of communicating to other devices on a network external to the voice messaging system.

BACKGROUND OF THE INVENTION

Messaging systems that provide voice and fax messaging capabilities are well known. One example of such a messaging system is the Network Applications Platform commercially available from UNISYS Corporation ("the NAP system"). The NAP system is a configuration of hardware and software that provides data and voice processing capabilities through applications running on an enterprise server. The NAP system provides the interface between these applications, called network applications, and a telephone network. A voicemail application is an example of a network application that runs on the NAP platform. The voicemail application determines how calls to the messaging system are handled, what prompts are played to callers, and which features are available. Presently, the NAP is implemented on selected UNISYS A Series and ClearPath HMP NX computer systems running the MCP operating system. Further details of the structure and function of the NAP are provided in the following U.S. patents and pending applications, all of which are hereby incorporated by reference in their entireties:

- U.S. Pat. No. 5,133,004, Jul. 21, 1992, "Digital Computer Platform for Supporting Telephone Network Applications";
- U.S. Pat. No. 5,138,710, Aug. 11, 1992, "Apparatus and Method for Providing Recoverability in Mass Storage Data Base Systems Without Audit Trail Mechanisms";
- U.S. Pat. No. 5,384,829, Jan. 24, 1995, "Digital Computer Platform for Supporting Telephone Network Applications";
- U.S. Pat. No. 5,323,450, Jun. 21, 1994, "Telephone Network Applications Platform for Supporting Facsimile Applications";
- U.S. Pat. No. 5,493,606, Feb. 20, 1996, "Multi-Lingual Prompt Management System for a Network Applications Platform";
- U.S. Pat. No. 5,633,916, May 27, 1997, "Universal Messaging Service Using Single Voice Grade Telephone Line Within a Client/Server Architecture";
- U.S. Pat. No. 6,058,166, May 2, 2000, "Enhanced Multi-Lingual Prompt Management in a Voice Messaging System With Support for Speech Recognition";
- U.S. patent application Ser. No. 08/964,744, filed Nov. 5, 1997, "Methods and Apparatus for Providing External Access to Executable Call Flows of a Network Application";
- U.S. patent application Ser. No. 08/987,571, filed Dec. 11, 1997, "Multiple Language Electronic Mail Notification of Received Voice and/or Fax Messages";
- U.S. patent application Ser. No. 09/161,214, filed Sep. 25, 1998, "Multiple Node Messaging System Wherein Nodes Have Shared Access To Message Stores Of Other Nodes";
- U.S. patent application Ser. No. 09/307,014, filed May 7, 1999, entitled "Inter-System Call Transfer"; and
- U.S. patent application Ser. No. 09/451,077, filed Nov. 30, 1999, entitled "Method and Apparatus for Preventing Hung Calls During Protocol Violations in a Voice Messaging System."

Generally, the NAP platform interfaces to a telephone network through a Network Interface Unit (NIU). Current NAP systems utilize a NIU available from Unisys Corporation, called the Telephony Services Platform (TSP). Generally, the TSP comprises a Multibus bus architecture that connects a variety of special purpose printed circuit boards that provide interfaces to the host computer system on which the NAP is implemented and to the telephone network to which the TSP is connected.

Figure 1:
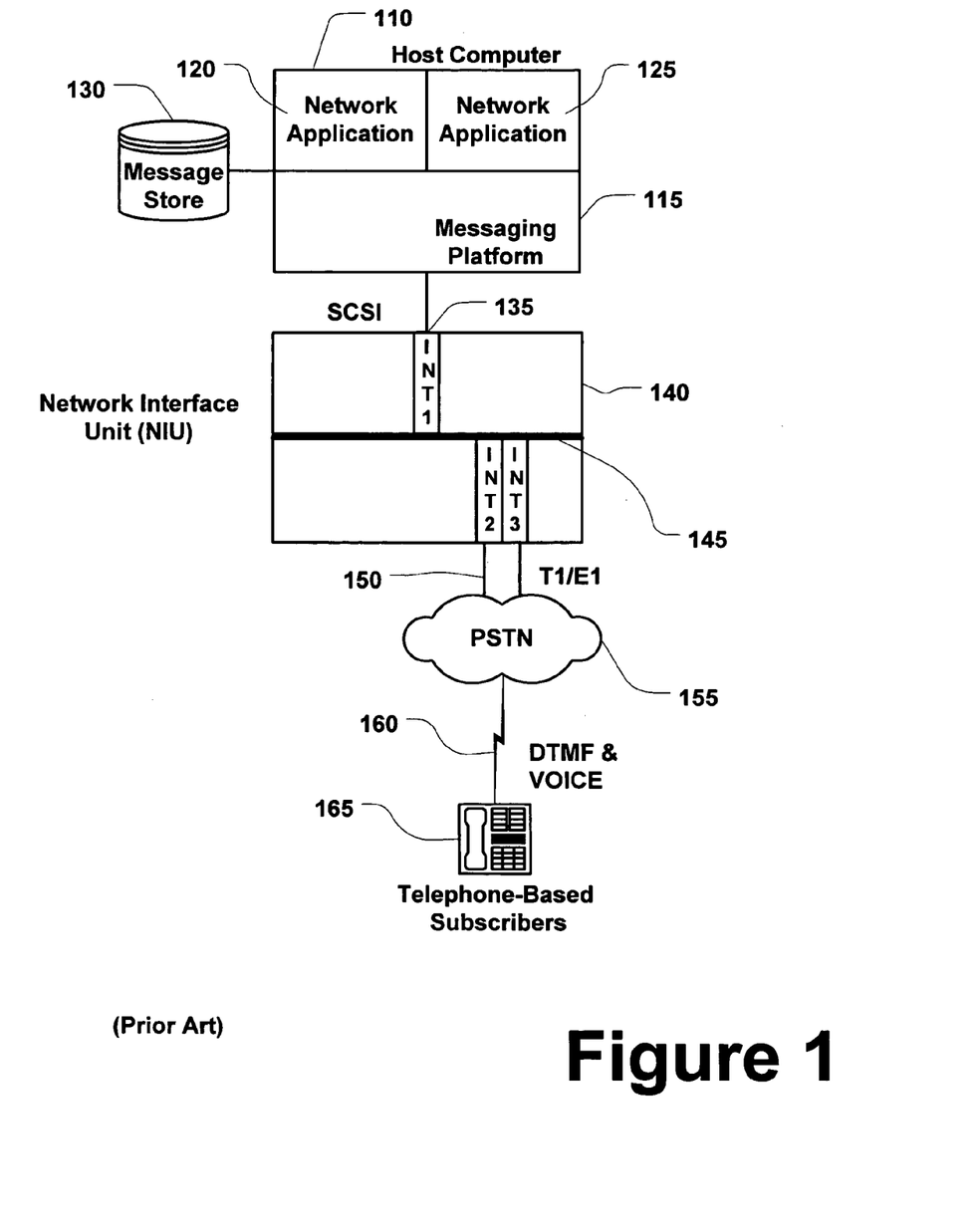
FIG. 1 is a system diagram of a prior art messaging system.

In greater detail, FIG. 1 shows a system diagram of a prior art messaging system 1100 based on the Unisys NAP architecture. As shown, the system 100 comprises host computer 110 that implements the NAP messaging platform 115, a network interface unit (NIU) 140, which in this example is the Unisys TSP, public switched telephone network 155, and telephone based subscribers 165. Network applications 120 and 125, which may be voice mail applications or any other application that provides telephony related services, run on the NAP platform 115 and cooperate with message store 130.

As shown, the NIU 140, which in this example comprises a Unisys TSP, contains a series of interfaces, interface 1 (INT1), interface 2 (INT2), and interface 3 (INT3). One interface, such as INT1, interfaces the NIU 140 to the NAP platform 115 on the host computer 110. Communication between INT1 and NAP platform 115 is via a Small Computer Systems Interface (SCSI) bus 135. Others of the interfaces, such as INT2 and INT3, interface NIU 140 to PSTN 155. In the current TSP design, interfaces such as INT1, INT2, and INT3 are implemented on printed circuit boards housed within the NIU that can communicate with each other via a common bus 145. Bus 145 implements the Multibus protocol.

In operation, telephone based subscribers 165 may request processing performed by network application 120 or 125, or alternatively, access data from message store 130. The request is transmitted from telephone-based subscriber 165 through PSTN 155 to NIU 140. At NIU 140, the proper interface (i.e. INT1, INT2, or INT3) may route the request to messaging platform 115 of host computer 110 running network applications 120 and 125. Similarly, requested processed data may be communicated back to telephone-based subscribers using this data path.

Figure 1A:
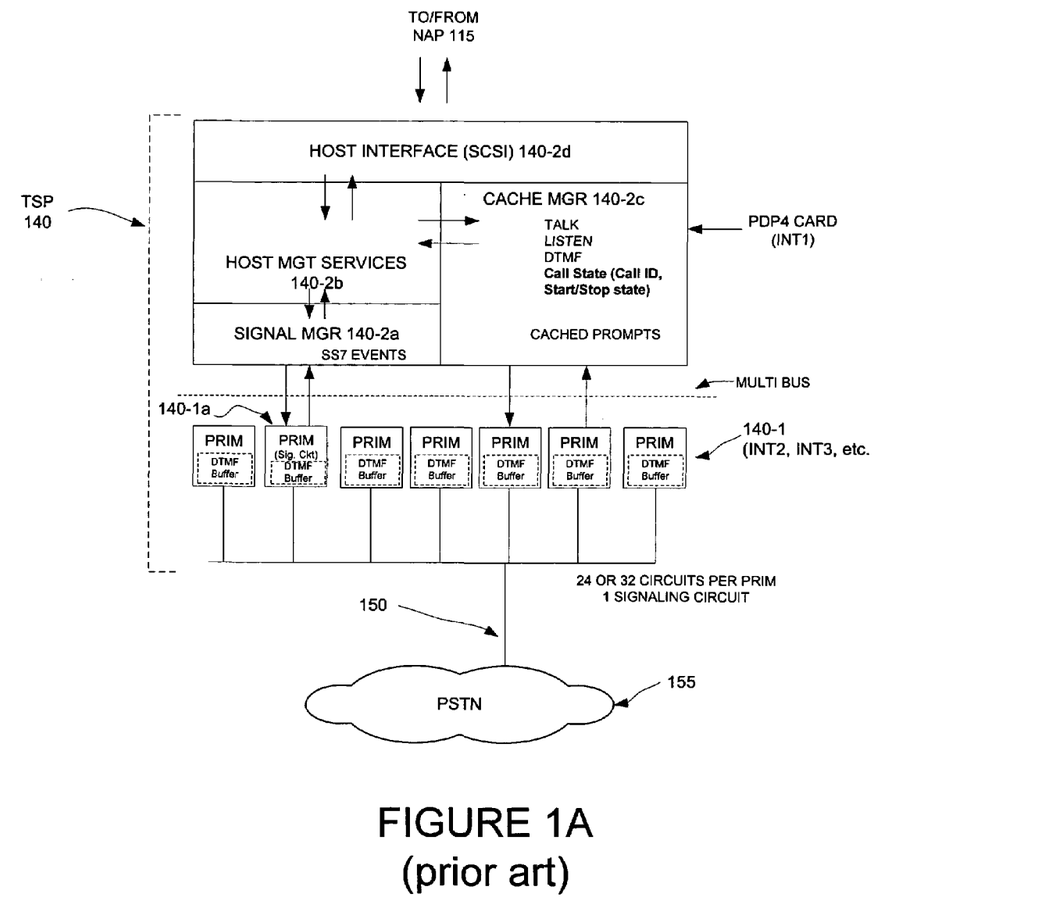
FIG. 1A is a block diagram providing further details of a prior art Network Interface Unit of the messaging system of FIG. 1.

FIG. 1a is a block diagram providing additional details of the Unisys TSP that implements the NIU 140 in FIG. 1. As shown, interfaces INT2, INT3 are each implemented in the TSP 140 by a Primary Rate Interface Modules (PRIMs) 14-1, of which there can be many in any given TSP. Interface INT1 is implemented by a PDP Card 140-2. Each PRIM 140-1 interfaces a set of (e.g., 24 or 32) telephone circuits to the PDP card 140-2. In addition, one PRIM 140-1a is dedicated to signaling, and communicates with the PDP Card's Signaling Manager 140-2a, which in turn communicates with a Host Management Services (HMS) module 140-2b. The HMS module 140-2b communicates with a Cache Manager 140-2c and a Host Interface module 140-2d. The overall function of the TSP 140 is to logically map a plurality of telephone circuits (e.g., 24 or 32 telephone circuits per PRIM) to a NAP host (e.g., host 110 of FIG. 1). The processes performed by the PRIM(s) 140-1, Signaling Manager module 140-2a, Host Management Services module 140-2b, Cache Manager module 140-2c and Host Interface module 140-2d are explained more fully in co-pending patent application Ser. No. 09/451,077, filed Nov. 30, 1999, entitled "Method and Apparatus for Preventing Hung Calls During Protocol Violations in a Voice Messaging System," which as mentioned above is incorporated herein by reference in its entirety.

Briefly, an SS7 packet received at a PRIM is routed to the Signaling Manager 140-2a, which is the SS7 User Part (SS7 level 4). The Signaling Manager converts the SS7 packet to a proprietary message that is ultimately received by the host 110. Before sending the message to the host, the HMS module 140-2b selects the host (there can be more than one host connected to a given TSP).

Thus, the components of a TSP 140 may be summarized as follows:

PRIM (Primary Rate Interface module) 140-1: The TSP PRIM module is used to send voice or receive voice from the network upon direction from the NAP 115

Signaling Manager 140-2a: The Signaling Manager is used to communicate to the network using a country specific protocol such as SS7 or ISDN. It also communicates to the NAP 115 for circuit maintenance and for call control.

HMS (Host Management Services module) 140-2b: The TSP HMS module is used to centralize the TSP's handling of the shared TSP functionality described in the aforementioned co-pending patent application Ser. No. 09/307,014, entitled "Inter-System Call Transfer". It insulates the rest of the TSP from the mechanics of switching calls from one host to another. It communicates to the NAP 115 to transfer calls and to configure the shared TSP environment. All TSP message traffic is routed through the HMS module.

CM (Cache Manager) 140-2c: The TSP CM module is used to provide a high speed buffering of commonly used voice messages to reduce demand on the NAP 115.

HIP (Host Interface Processor) 140-2d: The HIP board is used to communicate to the operating system of the host computer 110 using a SCSI bus to transfer and receive buffers of data between the NAP 115 and TSP. It enforces a protocol on the TSP to collect messages in an efficient manner to transmit to the host 110 and similarly breaks apart buffers from the host into messages that can be processed by other TSP modules.

Thus, as shown, the TSP 140 is connected to certain "ports" of the telephone network 155. A call coming into a given port is received by the TSP connected to that port. Specifically, a call comes into a PRIM board in the TSP, and the Signaling Manager on the PDP card of that TSP routes the call to the Host Management Services (HMS) module 140-2b. The call comes in on a reserved signaling channel 140-1a of the PRIM and is immediately transferred to the Signaling Manager 140-2a on the PDP board. The signaling manager reformats the call packet and gives it to the HMS module 140-2b, which in turn gives it to the Host Interface Module 140-2d. The Host Interface Module 140-2d places the call on the SCSI bus 135. The NAP 115 takes the call from the SCSI bus, creates a call record, interrogates a database information in memory to obtain the necessary information to route the call to the proper network application 120, 125, and then queues the call to an application interface module (AIM) (not shown). The AIM dequeues the call and gives it to the specified network application 120, 125.

Although effective in facilitating communication between various components of the NAP, the current TSP is limited to running particular proprietary hardware and software and for performing the special-purpose functions for which it was designed. This is the case with other prior art Network Interface Units as well. It would be desirable in a voice messaging system that employs a Network Interface Unit, such as the Unisys NAP, to have a general purpose computing capability within the NIU and also to have the ability to connect to networks external to the voice messaging system via that general purpose computing capability. The present invention satisfies such a need.

SUMMARY OF THE INVENTION

The present invention relates to a messaging system having a network interface unit (NIU) with an embedded services processor (ESP). In a contemplated messaging system architecture, the messaging platform may comprise a host computer having a messaging platform running messaging applications. The host computer may be electronically coupled to a NIU that may be connected to a telephone network. The NIU may comprise a first interface to the messaging platform on the host computer for communicating between the NIU and the messaging platform. Further, the NIU may comprise a second interface to the telephone network to receive calls from subscribers. The NIU may further comprise at least one ESP that may be operatively coupled to the first and second NIU interfaces. The ESP may comprise a processor, a memory, and an operating system executing on the processor that provide a general purpose computing capability within NIU for executing software applications that are otherwise incapable of executing within the NIU. The ESP may also provide a network interface for connection of the NIU to other computer networks external to the messaging system.

In an illustrative implementation, the ESP may be capable of running commercially available hardware and commodity software, and may have the ability to communicate with the computer networks external to the messaging system using Internet-based communication protocols and standards. In this implementation, the ESP may comprise a single board computer residing in the NIU that runs a commodity operating system providing an application execution environment, and that maintains a communications interface to enable Internet-based communication.

In operation, the ESP may interface with other NIU components by communicating messages over a standard Multibus bus architecture (i.e. Multibus (IEEE 1296) open bus standard). These messages may be communicated to the NIU components through resident Multibus messaging software to engage messaging system operation and functions.

BRIEF DESCRIPTION OF THE DRAWINGS

A presently preferred implementation of a messaging system running commercially available hardware and commodity software and communicating data employing Internet-based protocols and standards in accordance with the present invention is further described with reference to the accompanying drawings in which.

DETAILED DESCRIPTION OF PREFERRED EMBODIMENTS

The present invention is directed to a messaging system having a network interface unit (NIU) with an embedded services processor (ESP). According to the present invention, the messaging system comprises a messaging platform operating on a host computer and running messaging applications. The host computer is electronically coupled to a NIU that, in turn, is connected to a telephone network. The NIU comprises a first interface to the messaging platform on the host computer for communicating between the NIU and the messaging platform, and a second interface to the telephone network to receive calls from subscribers. The NIU further comprise at least one embedded services processor (ESP) that is operatively coupled to the first and second NIU interfaces through a bus backplane. In a preferred embodiment, the ESP comprises a processor, a memory, and an operating system executing on the processor that provide a general purpose computing capability within NIU for executing software applications that are otherwise incapable of executing within the NIU. The ESP may also provide a network interface for connection of the NIU to other computer networks external to the messaging system.

Figure 2:
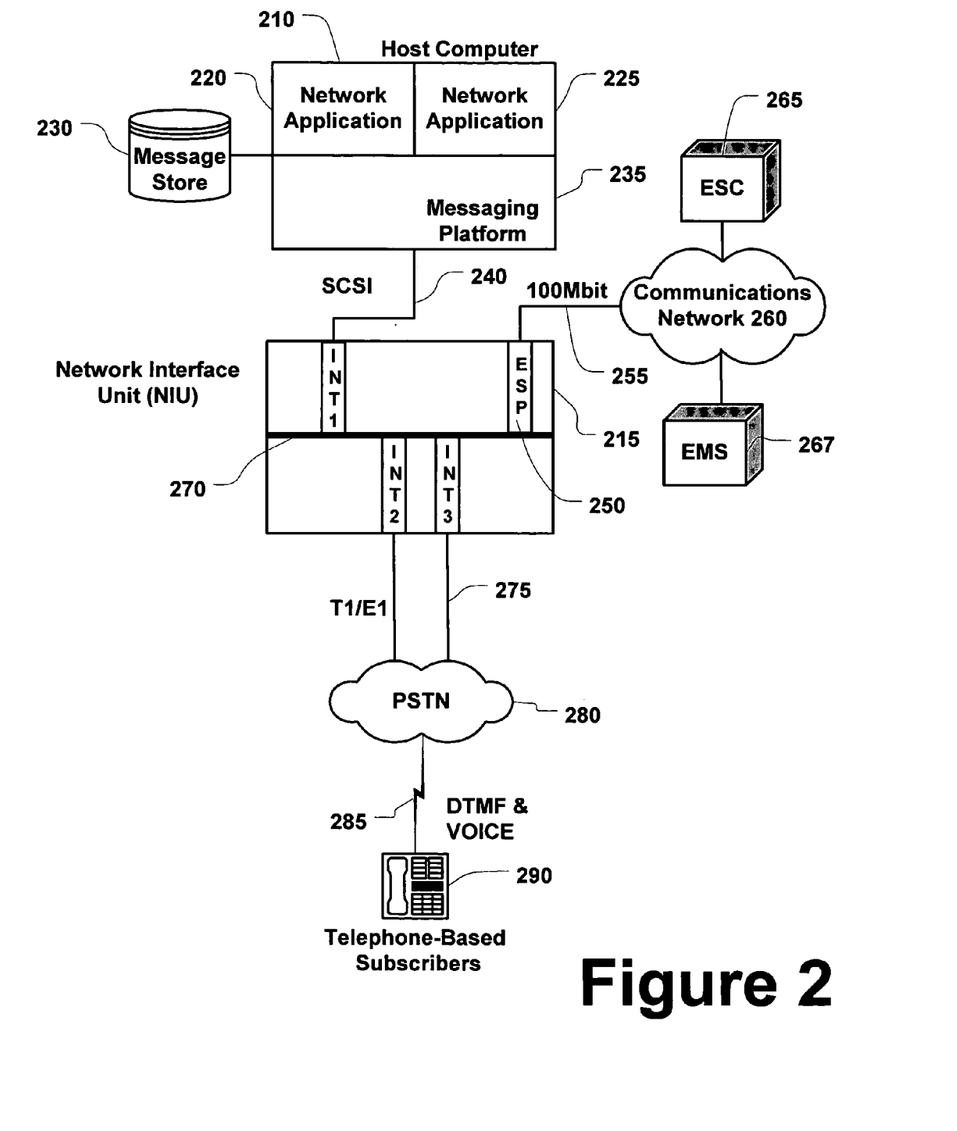
FIG. 2 is a block diagram of a messaging system in accordance with a preferred embodiment of the present invention.

FIG. 2 is a block diagram of a messaging system 200 in accordance with a preferred embodiment of the present invention. Messaging system 200 comprises host computer 210 electronically coupled to network interface unit (NIU) 215. In turn, NIU 215 is electronically coupled to public switched telephone network (PSTN) 280 that support telephone-based subscribers 290. As shown, host computer 210 comprises a messaging platform 235 that executes network applications 220 and 225, respectively. In addition, messaging platform may allow network applications 220 and 225 to cooperate with message store 230. Message store 230 may be used by messaging system 200 to store data for telephone-based subscribers 290. In the preferred embodiment, messaging platform 235 comprises the aforementioned Network Applications Platform (NAP) commercially available from Unisys Corporation, and the host computer 210 on which the NAP runs comprises a selected Unisys A Series or ClearPath HMP NX computer system. Host computer 210 communicates with NIU 215 via electronic connection 240.

In the preferred embodiment, the NIU 215 comprises a modified Telephony Services Processor (TSP) of the type described above and illustrated in FIGS. 1 and 1a. According to the present invention, the prior art TSP is modified by the addition of an embedded services processor (ESP) 250. In the preferred embodiment, the ESP 250 comprises a single board computer having its own processor, memory, and operating system executing on the processor, which together provide a general purpose computing capability within NIU for executing software applications that are otherwise incapable of executing within the NIU. Additionally, the ESP preferably also provides a network interface for connection of the NIU to other communications networks external to the messaging system, such as communications network 260. This network connection 260 can be used to communicate with an external server computer (ESC) 265 or external maintenance server (EMS) 267. ESC 265 may comprise server computer capable of operating various computing applications, such as, media processing applications that cooperate with messaging system 200. Comparatively, in ESP 267 comprises a personal computer (PC) executing a maintenance software application that may used to install ESP software, update ESP software, and monitor ESP status.

In one preferred implementation, the ESP 250 comprises an EWSIII SBCP5200 single board computer commercially available from RadiSys Corporation. This board includes an Intel Pentium processor and executes the Microsoft Windows NT 4.0 operating system. A pair of 10/100 BaseT Ethernet controllers provide the network interface for connecting to and communicating across communications network 260. This enables the ESP 250 to support connection to 100 Megabit Ethernet communications networks. The ESP 250 connects to the Multibus bus 270 within the standard TSP chassis, enabling it to communicate with the other interface boards INT1, INT2, INT3, etc. (e.g., PRIM and PDP boards) within the TSP 215.

Communication between the ESP and interface boards INT1, INT2, and INT3 of TSP 215 can occur one of two ways, using messaging passing or using interconnect spacing. Generally, a message is a unit of data that is passed over Multibus 270. Further, any application employing Multibus 270 can send a message to any other application running on the same interface board or to any other interface board connected to Multibus 270, independent of operating system. A message contains a sender address and a destination address. The addresses, when taken in combination, define a slot (i.e. an interface board in the system) and a port (a function of this interface board). If messaging passing is employed, the source and the destination of the message must be identified. This is accomplished by assigning a slot number and a Port ID to the source and destination of the message, respectively. The slot number identifies the interface board's backplane slot and port ID identifies the desired function to be carried out by the interface board having the slot number. Comparatively, interconnect space messaging employs an address space, that is separate from conventional memory and I/O spaces. In the interconnect space, interface boards coupled to Multibus 270 can exchange data. The data is passed using Multibus 270 employs access methods and message structures of the Multibus (IEEE 1296) open bus standard.

Having a general purpose computing capability within NIU (TSP) 215, and more generally, at the point in the architecture of messaging system 200 where the messaging platform 235 interfaces to the telephone network 280, enables a variety of new and improved features and operations for the messaging system 200. For example, the network interface connection provided by the ESP 250 can be used to transfer call information from NIU 215 to another NIU (not shown) in a distributed messaging system architecture, as more fully described in co-pending, commonly assigned, patent application Ser. No. 09/636,666, filed herewith, and entitled "Distributed Network Applications Platform Architecture", which is incorporated herein by reference in its entirety. The ESP 250 can also be utilized as a mechanism for offloading certain kinds of processing from the host computer system 210 of the messaging platform 200 to another computer, such as the external server computer 265 of FIG. 2. Specifically, as described in co-pending, commonly assigned patent application Ser. No. 09/636/677, filed herewith, entitled "Media Resource Server in a Universal Messaging System", which is also incorporated herein by reference in its entirety, the ESP 250 can be used to offload certain forms of multi-media processing in a universal messaging system, such as text-to-speech (TTS) processing, Automated Speech Recognition (ASR), and natural language understanding (NLU).

Figure 3:
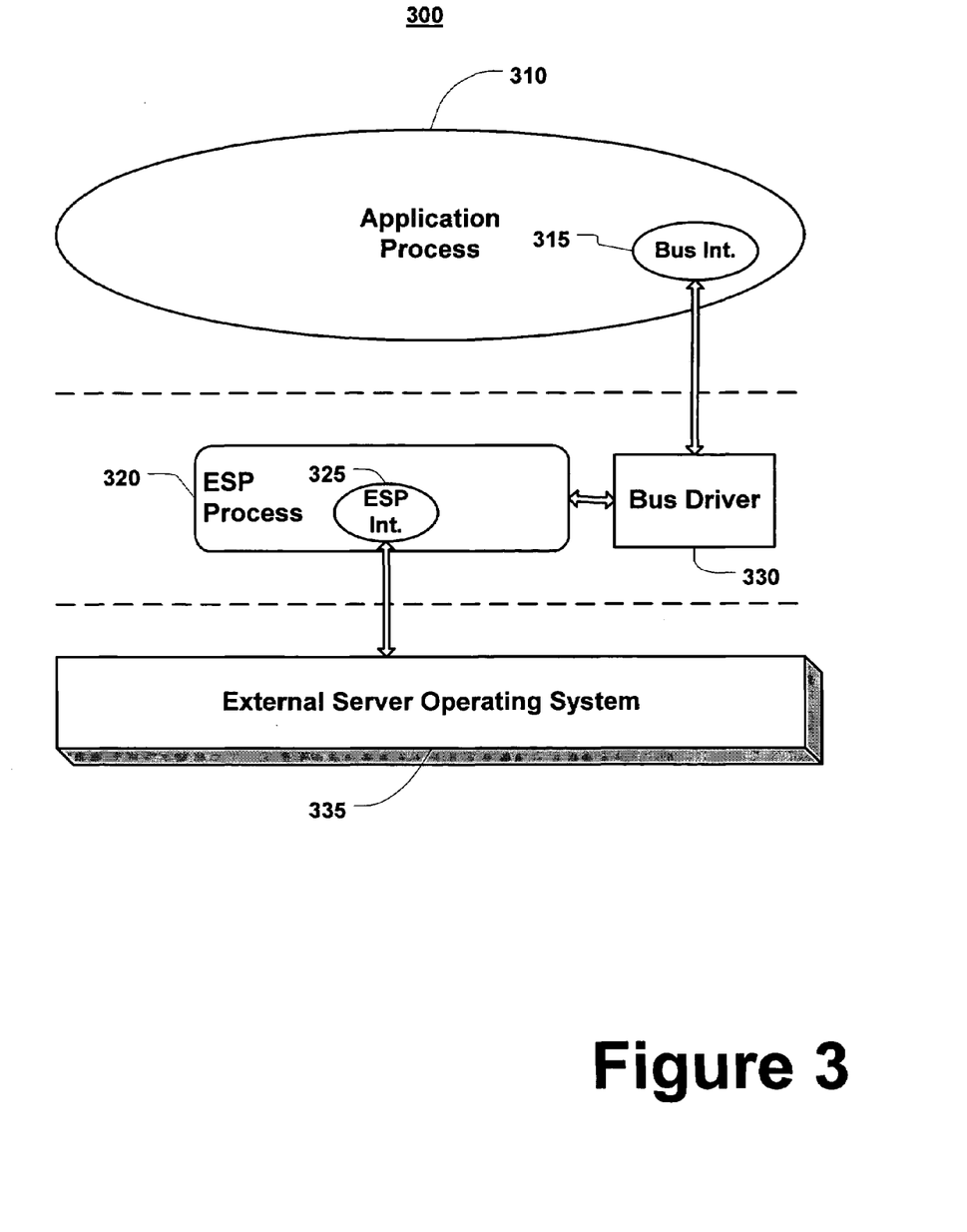
FIG. 3 is a block diagram of a software architecture of the messaging system of the present invention.

FIG. 3, with reference to FIG. 2, shows contemplated software architecture 300 of messaging system 200. Software architecture may be used when deploying ESP 250 in messaging system 200, particularly in application in which the ESP 250 will be used to communicate with an ESC 265. As shown, software architecture 300 comprises application process 310 (that executes on host computer 210), ESP process 320 (that executes on ESP 250), external server operating system 330 (of ESC 265) and bus driver 335. The hash lines demarcate the physical separation of the software that operates on different components of the messaging system. Host computer 210 may execute application process 310 that comprises bus interface 315. As noted in FIG. 2, ESP 250 may communicate with host computer 210 through bus 270 of NIU 215. In operation, bus interface 315 may be employed by application process 310 in conjunction with bus driver 330 to communicate with ESP process 320. Bus interface 315 and bus driver 330 are required to communicate data along bus 270. As indicated by the arrows, data may freely move between external server operating system 335, ESP process 325, and application process 310.

In operation, application process 310 may require external server operating system 335 to execute various instructions or perform processing, as is the case in the aforementioned co-pending application entitled "Media Resource Server in a Universal Messaging System". Application process 315 communicates these instructions to ESP process 320 through bus interface 315 and bus driver 330. In turn, ESP process 320 processes the instructions and communicates them to external server operating system 335 for processing using ESP interface 325. The processed data may then be communicated back to application process 310 using the same communication path.

Figure 4:
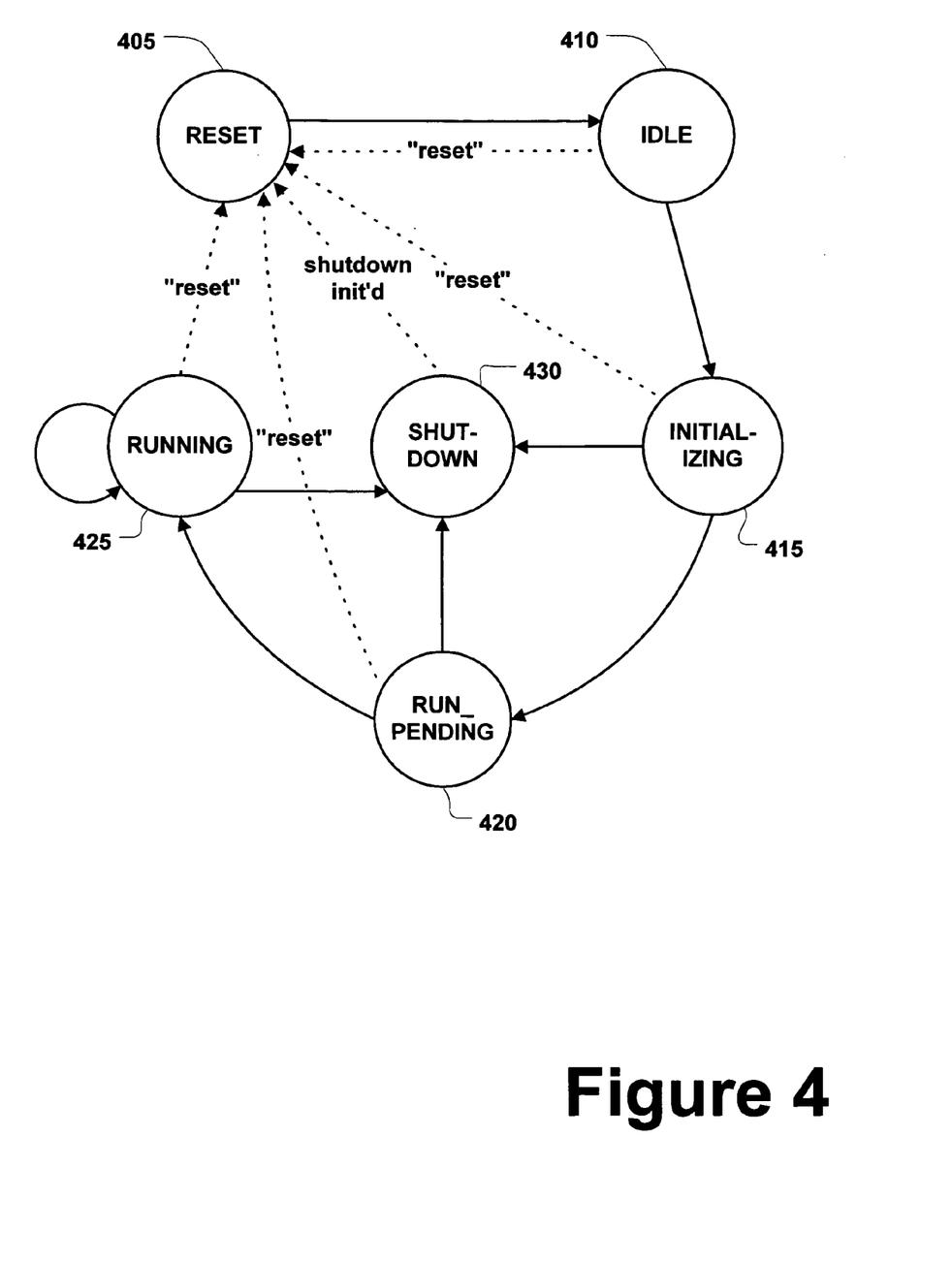
FIG. 4 is a state diagram of the processing states experienced by an embedded services processor (ESP) in accordance with the present invention.

FIG. 4 shows ESP processing states when the ESP processes data in accordance with messaging system functions and operations. As shown, the ESP 250 supports the following processing states RESET 405, IDLE 410, INITIALIZING 415, RUN_PENDING 420, RUNNING 425, and SHUTDOWN 430. The RESET processing state 405 may be used to reset the ESP from any other ESP processing state. In the IDLE 405 state, the ESP is in a wait mode to begin initialization at processing state INITIALIZING 413. Once initialized, the ESP may proceed to the RUN_PENDING 420 processing state where required ESP processing is queued. From there, the ESP is capable of performing required processing at the RUNNING 425 processing state. Alternatively, once initialized, the ESP may proceed to SHUTDOWN 430 processing state, where the ESP is powered down. The SHUTDOWN 430 processing state may also follow a completed RUNNING 425 processing state. In operation, the ESP may execute these processing states in accordance with processing instructions received from cooperating messaging system components.

Figure 5:
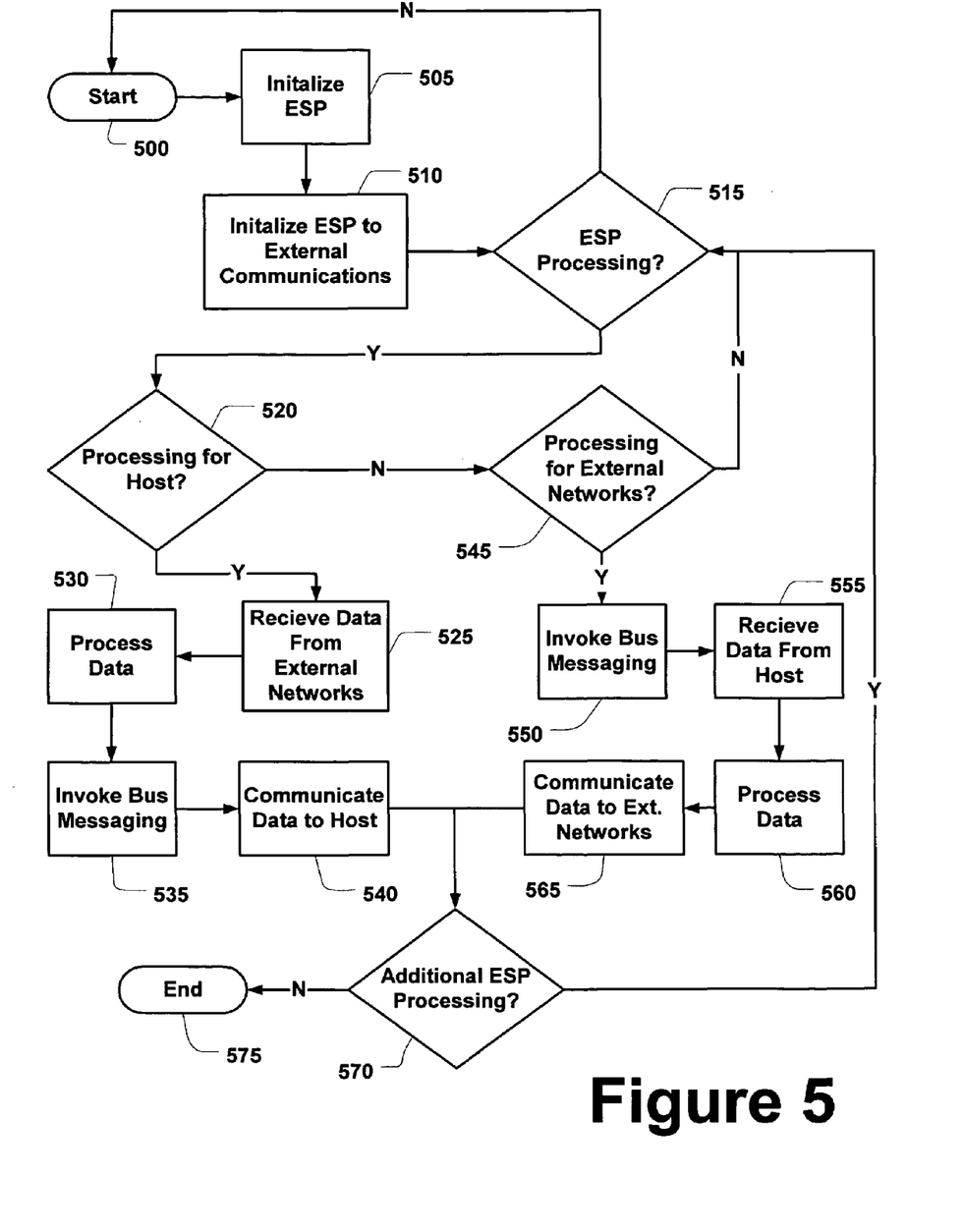
FIG. 5 is a flow diagram of the processing performed by the messaging system when executing messaging application functions in accordance with the present invention.

FIG. 5 shows the processing performed by the ESP when executing messaging system operations. Processing starts at block 500 and proceeds to block 505 where the ESP is initialized to cooperate with other messaging system components. Processing then proceeds to block 510 where the ESP is initialized to process external communications. A check is then performed at block 515 to determine if the operation that is executed requires ESP processing. If ESP processing is not required, processing proceeds to block 500. However, if the alternative proves to be true, processing proceeds to block 520 where a check is a performed to determine if the ESP processing is to be performed to communicate data to the host computer 210 (of FIG. 2). If the ESP processing is intended for the host computer, processing proceeds to block 525 where the ESP receives data from external networks (e.g., network 260) for processing. The data is then processed at block 530. The ESP then proceeds to invoke bus messaging at block 535 to be able to communicate the processed data to the host computer at block 540. Processing then proceeds to block 570 where a check is performed to determine if there is additional required ESP processing. If additional ESP processing is required, processing proceeds to block 515 and therefrom. However, if the contrary proves true, processing terminates at block 575.

If, however, at block 520 the ESP processing is not intended to process data for the host computer, processing proceeds to block 545 where a check is performed to determine if the ESP processing is intended to communicate data to external networks (e.g., network 260). If the results of this check prove to be negative (i.e., ESP processing not intended for external networks), processing proceeds to block 515 and therefrom. However, if the contrary proves to be true, processing proceeds to block 550 where the ESP invokes bus messaging to receive data from the host computer at block 555. The data is then processed by the ESP at block 560 and communicated to the requesting external networks at block 565. Processing proceeds to block 570 and therefrom.

As the foregoing illustrates, the present invention is directed to a messaging system having a network interface unit (NIU) with an embedded services processor (ESP) that provides a general purpose computing capability within the NIU and that may also have the ability to connect to networks external to the messaging system via that general purpose computing capability. It is understood that changes may be made to the embodiments described above without departing from the broad inventive concepts thereof. For example, the present invention is by no means limited to use in a messaging system that employs the Unisys Network Applications Platform, nor is the invention limited to use with the Unisys Telephony Services Processor (TSP). Rather, the present invention may be employed in connection with any suitable messaging platform and network interface unit architecture. Accordingly, the present invention is not limited to the particular embodiments disclosed, but is intended to cover all modifications that are within the spirit and scope of the invention as defined by the appended claims.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

What is claimed is:

1. A messaging system comprising:
   at least one host computer, said host computer comprising a messaging platform upon which messaging applications are executed and a message store for storing messages received by said messaging platform;
   at least one network interface unit (NIU) having a first interface to the messaging platform on the host computer for communicating between said NIU and said messaging platform and a second interface to a telephone network for receiving calls from said telephone network, and an internal bus coupled to a first module having said first interface and coupled to a second module having said second interface; and
   at least one embedded services processor unit (ESP), located within the NIU, coupled to said internal bus supporting communications with said first module and said second module of said NIU, said ESP comprising a processor, a memory, an operating system executing on said processor for executing software applications that are otherwise incapable of executing within said NIU, and a network interface that supports an IP protocol for communicating between said ESP and a network external to said messaging system, the network connecting to at least one remote external server computer, wherein the remote external server computer provides multi-media processing for the messaging platform.

2. The system recited in claim 1, wherein said operating system of said ESP operating system comprises Microsoft Windows NT.

3. The system recited in claim 1, wherein said bus implements the Multibus (IEEE 1296) open bus standard.

4. The system recited in claim 3, wherein said ESP communicates to other NIU interfaces using messaging protocols and standards in accordance with said Multibus (IEEE 1296) open bus standard.

5. The system recited in claim 1, wherein said ESP is capable of cooperating with commercially available messaging system hardware and operating system commodity software.

6. The method recited in claim 1, wherein said ESP is capable of engaging a variety of operating states comprising any of: RESET, IDLE, INITIALIZING, UN-PENDING, RUNNING, and SHUTDOWN.

7. The method recited in claim 6, wherein said RESET state may be invoked by any of said other operating states.

8. In a messaging system having a host computer coupled to a network interface unit (NIU), wherein the host computer comprises a messaging platform upon which messaging applications are executed, and wherein the NIU has a first interface to the messaging platform on the host computer for communicating between said NIU and said messaging platform and a second interface to a telephone network for receiving calls from said telephone network, a method comprising the steps of:
   accessing an embedded services processor unit (ESP) within the NIU that is operatively coupled to the first and second interfaces of the NIU, said ESP comprising a processor, a memory, an operating system executing on said processor for executing software applications and a network interface to an external network;
   executing software applications on said ESP that are otherwise incapable of executing within said NIU, and
   executing at least one multimedia application for the messaging platform on an external server computer remotely located on said external network;
   wherein said first interface resides on a first module in the NIU and said second interface resides on a second module in the NIU, the modules and said ESP being interconnected via an internal bus.

9. The method recited in claim 6, wherein said accessing step further comprises initializing said ESP to cooperate with components of said messaging system and to communicate with said external network.

10. The method recited in claim 8, wherein executing at least one multimedia application comprises using an IP communication protocol to transfer data between said ESP and said external server computer on said external network.

11. The method recited in claim 8, wherein said ESP is capable of engaging a variety of operating states comprising any of: RESET, IDLE, INITIALIZING, UN-PENDING, RUNING, and SHUTDOWN.

12. The method recited in claim 11, wherein said RESET state may be invoked by any of said other operating states.

* * * * *

UNITED STATES PATENT AND TRADEMARK OFFICE
CERTIFICATE OF CORRECTION

PATENT NO. : 7,116,764 B1  Page 1 of 1
APPLICATION NO. : 09/636656
DATED : October 3, 2006
INVENTOR(S) : Gary P. Russel et al.

It is certified that error appears in the above-identified patent and that said Letters Patent is hereby corrected as shown below:

In Column 10; Claim 6; Line 7 delete "method" and insert --system-- after the word "The".

In Column 10; Claim 7; Line 11 delete "method" and insert --system-- after the word "The".

Signed and Sealed this

Thirteenth Day of November, 2007

JON W. DUDAS
*Director of the United States Patent and Trademark Office*